US012571454B2

(12) United States Patent
Sander et al.

(10) Patent No.: US 12,571,454 B2
(45) Date of Patent: Mar. 10, 2026

(54) GEAR MECHANISM HAVING A GEAR STAGE AND INCLUDING A SUN GEAR, PLANET GEARS AND A CROWN-TOOTHED GEAR

(71) Applicant: SEW-EURODRIVE GMBH & CO. KG, Bruchsal (DE)

(72) Inventors: Joachim Sander, Ubstadt-Weiher (DE); Martin Hugelmann, Graben-Neudorf (DE); Daniel Figuli, Graben-Neudorf (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 18/708,294

(22) PCT Filed: Nov. 2, 2022

(86) PCT No.: PCT/EP2022/080597
§ 371 (c)(1),
(2) Date: May 8, 2024

(87) PCT Pub. No.: WO2023/078960
PCT Pub. Date: May 11, 2023

(65) Prior Publication Data
US 2025/0012342 A1     Jan. 9, 2025

(30) Foreign Application Priority Data

Nov. 8, 2021     (DE) ..................... 10 2021 005 506.3

(51) Int. Cl.
*F16H 1/28*       (2006.01)
*F16H 3/50*       (2006.01)
*F16H 57/021*     (2012.01)

(52) U.S. Cl.
CPC ......... *F16H 1/2854* (2013.01); *F16H 57/021* (2013.01); *F16H 3/50* (2013.01)

(58) Field of Classification Search
CPC ........ F16H 1/06; F16H 1/12–145; F16H 1/18; F16H 1/203; F16H 1/222; F16H 1/2854;
(Continued)

(56) References Cited

U.S. PATENT DOCUMENTS 1,392,567 A  *  10/1921  Horine .................. F16H 1/2854
                                                        475/332
2,267,562 A      12/1941  Higgins
(Continued)

FOREIGN PATENT DOCUMENTS

FR              847311 A       10/1939
JP          H03239815 A        10/1991
WO       2018/222091 A1        12/2018

OTHER PUBLICATIONS

International Report on Patentability issued in corresponding International Application No. PCT/EP2022/080597, dated May 2, 2024, pp. 1-15, English Translation.
International Search Report issued in corresponding International Application No. PCT/EP2022/080597 dated Mar. 31, 2023, pp. 1-3, English Translation.

*Primary Examiner* — James J Taylor, II
(74) *Attorney, Agent, or Firm* — Carter, DeLuca & Farrell LLP

(57)                    ABSTRACT
In a gear mechanism having a gear stage, the input shaft is oriented coaxially to the output shaft. The first planet carrier is connected to the input shaft for conjoint rotation, e.g., is integrally formed therewith. The first gear wheel is connected to the second gear wheel for conjoint rotation, the first planet gear is connected to the second planet gear for conjoint rotation, and the first crown-toothed gear is connected to the housing for conjoint rotation. The toothing of the first planet gear meshes with the toothing of the first crown-toothed gear, and the toothing of the second planet
(Continued)

gear meshes with a crown toothing formed on the second planet carrier. A bearing for rotatably mounting the first and second gear wheel is received in the second planet carrier, the toothing of the first gear wheel meshes with the toothing of the second crown-toothed gear, the second crown-toothed gear is connected to the housing for conjoint rotation, and the toothing of the second gear wheel meshes with a crown toothing of the output shaft.

27 Claims, 9 Drawing Sheets

(58) Field of Classification Search
CPC ............ F16H 3/363; F16H 3/423; F16H 3/50; F16H 57/021
See application file for complete search history.

(56) References Cited

U.S. PATENT DOCUMENTS

| | | | | |
|---|---|---|---|---|
| 2,480,806 | A | * | 8/1949 | Hyacinthe ............... F16H 48/08 |
| | | | | 416/129 |
| 3,980,151 | A | | 9/1976 | Murayama |
| 4,286,481 | A | * | 9/1981 | Miller ................... F16H 1/2854 |
| | | | | 475/242 |
| 4,693,685 | A | * | 9/1987 | Pernot .................... A61C 1/185 |
| | | | | 433/105 |
| 11,821,492 | B2 | * | 11/2023 | Stadtfeld ................. F16H 48/08 |
| 2015/0148184 | A1 | | 5/2015 | Zanella |
| 2019/0093736 | A1 | | 3/2019 | Liu |
| 2019/0234489 | A1 | | 8/2019 | Reed |

\* cited by examiner

GEAR MECHANISM HAVING A GEAR STAGE AND INCLUDING A SUN GEAR, PLANET GEARS AND A CROWN-TOOTHED GEAR

FIELD OF THE INVENTION

The present invention relates to a gear mechanism having a gear stage and including a sun gear, planet gears and a crown-toothed gear.

BACKGROUND INFORMATION

In certain conventional systems, a planetary-gear mechanism has a sun gear which is oriented coaxially to a ring gear, in which respective toothings of the planetary gears mesh with toothings of the sun gear as well as with the toothing of the ring gear. The planetary gears are rotatably mounted in a planet carrier, which is arranged as the output shaft of the gear mechanism.

A transmission with planetary gears is described in German Patent Document No. 10 2017 010 522.

A gear mechanism is described in U.S. Patent Application Publication No. 2015/0148184.

A wheel drive is described in U.S. Pat. No. 3,980,151.

A rotating force transmission device is described in Japanese Patent Document No. 3-239815.

A differential transmission is described in U.S. Patent Application Publication No. 2019/0234489.

SUMMARY

Example embodiments of the present invention provide a compact, high-performance gear mechanism with a long service life.

According to example embodiments, in a gear mechanism having a gear stage, the gear mechanism includes a gear stage, in which the gear mechanism has an input shaft, a first planet carrier, planet gears, a first crown-toothed gear, a second planet carrier, a second crown-toothed gear, a first gear wheel, e.g., a gear, a second gear wheel, e.g., a gear, an output shaft, and a housing. The input shaft is oriented coaxially to the output shaft, and the first planet carrier is connected to the input shaft for conjoint rotation, e.g., is integrally formed therewith. The axes of rotation of the first gear wheel, the second gear wheel, the first planet gear, and the second planet gear are arranged coaxially to each other and/or oriented perpendicular to the axis of rotation of the input shaft. The first gear wheel is connected to the second gear wheel for conjoint rotation, the first planet gear is connected to the second planet gear for conjoint rotation, and the first crown-toothed gear is connected to the housing for conjoint rotation. The toothing of the first planet gear meshes with the toothing of the first crown-toothed gear, and the toothing of the second planet gear meshes with a crown toothing formed on the second planet carrier. A bearing for rotatably mounting the first and second gear wheel is received in the second planet carrier, the toothing of the first gear wheel meshes with the toothing of the second crown-toothed gear, and the second crown-toothed gear is connected to the housing for conjoint rotation. The toothing of the second gear wheel meshes with a crown toothing of the output shaft.

Thus, a very high transmission ratio can be achieved in a very small installation space, and a long service life can be achieved.

According to example embodiments, the bearing received in the second planet carrier supports a second bolt on which the first gear wheel is rotatably mounted. Thus, the planetary gear mechanism is readily produced.

According to example embodiments, a bearing received in the first planet carrier supports a first bolt on which the first planet gear is rotatably mounted. Thus, the planetary gear mechanism is readily produced.

According to example embodiments, the gear mechanism has an input shaft, a sun gear, a first planet carrier, planet gears, a first crown-toothed gear, an output shaft, and a housing. The input shaft is oriented coaxially to the output shaft, the input shaft has a first crown toothing on its end face facing the output shaft, and the output shaft has a second crown toothing on its end face facing the input shaft. The first crown toothing is at a distance from the second crown toothing. The toothing of a first gear meshes with the first crown toothing, the toothing of a second gear meshes with the second crown toothing, and the first gear is connected to the second gear for conjoint rotation. The first gear is at a distance from the second gear, the axis of rotation of the first gear is at a distance from the axis of rotation of the input shaft, and the direction of the axis of rotation of the first gear has an angle between 0° and 90°, e.g., between 5° and 85°, to the direction of the axis of rotation of the input shaft, e.g., is thus oriented neither perpendicularly nor parallel. For example, the axis of rotation of the first gear is oriented coaxially to the axis of rotation of the second gear.

Thus, the input shaft can be guided out on the same side as the output shaft, a high transmission ratio can be achieved in a small installation space, and a long service life can be achieved.

According to example embodiments, the gear mechanism has an input shaft, a sun gear, a first planet carrier, planet gears, a first crown-toothed gear, an output shaft, and a housing. The input shaft is oriented coaxially to the output shaft, the output shaft is arranged as a hollow shaft, the input shaft projects through the output shaft, and the axes of rotation of the first planet gear and the second planet gear are arranged coaxially to each other and/or have an angle of between 10° and 80° to the axis of rotation of the input shaft. The first planet gear is connected to the second planet gear for conjoint rotation, the first crown-toothed gear is connected to the housing for conjoint rotation, and the sun gear is connected to the input shaft for conjoint rotation. The toothing of the first planet gear meshes with the toothing of the first crown-toothed gear and with the toothing of the sun gear, and the toothing of the second planet gear meshes with a crown toothing formed on the output shaft. For example, the first planet gear and the second planet gear are rotatably mounted relative to the planet carrier via bearings which are received in the planet carrier or which are plugged onto a bolt which is connected to the planet carrier for conjoint rotation. For example, the planet carrier is rotatably mounted relative to the output shaft via a bearing received by the output shaft. For example, the radial distance range covered by the planet carrier relative to the axis of rotation of the output shaft is included by the radial distance range covered by the output shaft relative to the axis of rotation of the output shaft. For example, the radial distance range covered by the planet carrier relative to the axis of rotation of the output shaft is arranged radially within the radial distance range covered by the crown toothing of the output shaft relative to the axis of rotation of the output shaft. Thus, a high transmission ratio can be realized in a small installation space, and a long service life can be achieved.

According to example embodiments, the axis of rotation of a first planet gear forms a plane with the axis of rotation of the sun gear, to which plane the axis of rotation of a further first planet gear is not parallel but intersects the axis of rotation of the sun gear at the same intersection point as the axis of rotation of the first planet gear. Thus, imbalance can be reduced by increasing the number of first planet gears.

According to example embodiments, the gear stage has two or three, e.g., exactly three, first planet gears, the axes of rotation of the three first planet gears intersect the axis of rotation of the sun gear at the same intersection point, and/or the axes of rotation of the first planet gears are at regular distances from each other in the circumferential direction relative to the axis of rotation of the sun gear. Thus, the imbalance can be reduced.

According to example embodiments, the axes of rotation of the planet gears intersect the axis of rotation of the sun gear at the same intersection point, and/or the axes of rotation of the planet gears are at regular distances from each other in the circumferential direction relative to the axis of rotation of the sun gear. Thus, imbalance can be reduced and a high transmission ratio can be realized in a small installation space.

According to example embodiments, the toothing of the sun gear is spiroplan-toothed and/or is arranged in the shape of a spiral. For example, the envelope of the toothing of the sun gear is arranged in the shape of a truncated cone. Thus, low losses can be achieved despite high transmission ratios.

According to example embodiments, the toothing of the first planet gear is spiroplan-toothed and/or is arranged in the shape of a spiral. For example, the envelope of the toothing of the sun gear is arranged in the shape of a truncated cone. Thus, the toothing can be produced cost-effectively.

According to example embodiments, the largest diameter of the sun gear, e.g., the tip diameter of the toothing of the sun gear, is smaller than the largest diameter of the respective planet gear, e.g., than the largest tip diameter of the toothing of the respective planet gear. Thus, imbalances can be reduced.

According to example embodiments, the largest radial distance covered by the sun gear relative to the axis of rotation of the sun gear is smaller in amount than the largest radial distance covered by the planet gear relative to the axis of rotation of the respective planet gear. Thus, imbalance on the fast rotating input shaft can be reduced.

According to example embodiments, the largest diameter of the sun gear, e.g., the tip diameter of the toothing of the sun gear, is larger than the largest diameter of the respective planet gear, e.g., than the largest tip diameter of the toothing of the respective planet gear. Thus, with suitable dimensioning and precise mounting of the bearings of the input shaft, smooth running of the input shaft together with the sun gear can be ensured and thus smoother operation of the gear mechanism as well as a lower load on the bearings of the planet gears can be achieved.

According to example embodiments, the largest radial distance covered by the sun gear relative to the axis of rotation of the sun gear is larger in amount than the largest radial distance covered by the planet gear relative to the axis of rotation of the respective planet gear. Thus, with suitable dimensioning and precise mounting of the bearings of the input shaft, smooth running of the input shaft together with the sun gear can be ensured and thus smoother operation of the gear mechanism as well as a lower load on the bearings of the planet gears can be achieved.

According to example embodiments, the teeth of the toothing of the crown-toothed gear are curved, i.e., increasingly offset in the circumferential direction in relation to the axis of symmetry and/or axis of rotation of the crown-toothed gear with increasing radial distance. Thus, an axle offset and a high transmission ratio can be effected.

According to example embodiments, the sun gear, a planet gear, and/or the crown-toothed gear is made of carburized steel. Thus, a high torque can be transmitted.

According to example embodiments, there is an angle, e.g., a cross-axis angle, of between 48° and 82° between the axis of rotation of the sun gear and the axis of rotation of a respective planet gear. Thus, the gear mechanism can be arranged very compactly and a low radial extension is sufficient.

According to example embodiments, the cross-axis angle between an axis of rotation of a respective planet gear and the axis of symmetry and/or axis of rotation of the crown-toothed gear or sun gear is between 98° and 132°. Thus, the gear mechanism can be constructed very compactly.

According to example embodiments, a further gear stage is arranged in the same manner as the first gear stage, and the numbers of teeth of the toothing of the toothing parts are different in each case. Thus, a higher transmission ratio can be achieved.

According to example embodiments, the further gear stage has a sun gear connected to the crown-toothed gear of the first gear stage for conjoint rotation, the further gear stage has a second crown-toothed gear arranged as an output shaft, and the respective toothing of the planet gears of the further gear stage meshes in each case with the toothing of the sun gear of the further gear stage and also with the toothing of the crown-toothed gear. Thus, the second gear stage can be provided with little effort.

Further features and aspects of example embodiments of the present invention are explained in more detail below with reference to the appended schematic Figures.

DETAILED DESCRIPTION

Figure 1:
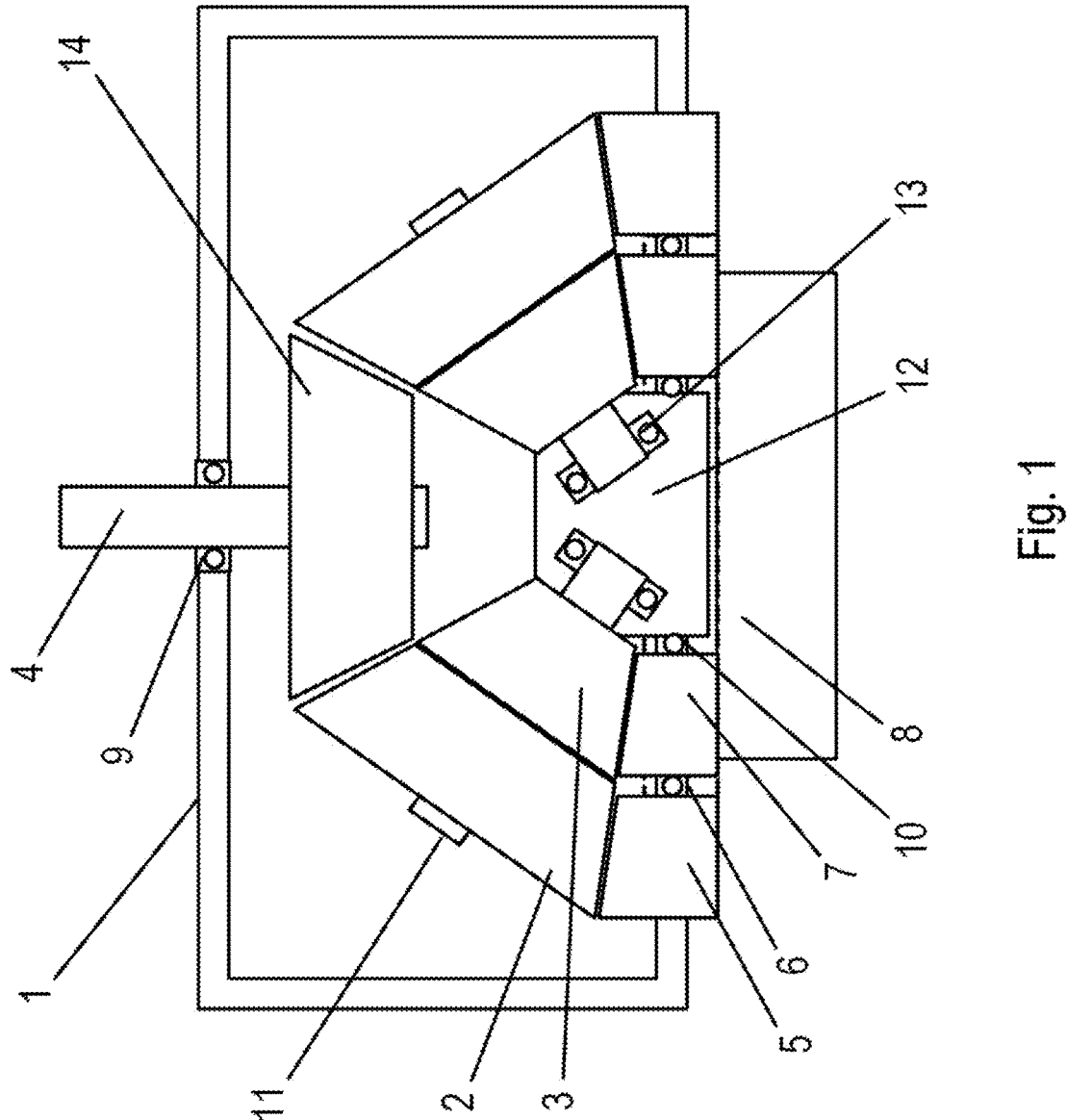
FIG. 1 illustrates a planetary gear mechanism with a central gear 14, e.g., a sun gear, which is connected to an input shaft 4 for conjoint rotation.

As illustrated in FIG. 1, the input shaft 4 is rotatably mounted in the housing of the planetary gear mechanism via a bearing 9. The position of the bearing 9 can be adjusted using shims.

A first planet gear 2 meshes with the sun gear 14, and is arranged on a bolt 10, which is rotatably mounted in a planet carrier 12 via a bearing 13.

The first planet gear 2 also meshes with a first crown-toothed gear 5, and the crown-toothed gear 5 is connected to the housing 1 for conjoint rotation.

A second planet gear 3, e.g., planetary gear, is arranged on the bolt 11, and the second planet gear 3 is connected to the planet gear 2 for conjoint rotation. Thus, during operation, the planet carrier 12 is set in rotary motion when the input shaft 4 is driven.

The second planet gear 3 is arranged in mesh with a second crown-toothed gear 7, and a bearing 6 is arranged between the first and the second crown-toothed gear 7 for rotatably mounting the second crown-toothed gear 7, which is connected to the output shaft 8 of the gear mechanism for conjoint rotation.

To further stabilize the second crown-toothed gear 7, a bearing 10 is also arranged between the planet carrier 12 and the second crown-toothed gear 7.

A bearing 13 is received in the planet carrier 12 for rotatably mounting the respective bolt 11.

The axis of rotation of the respective bolt 11 intersects the axis of rotation of the input shaft 14, e.g., which is oriented coaxially to the axis of rotation of the output shaft 8.

For example, the axis of rotation of the respective bolt has an angular amount between 30° and 60° to the axis of rotation of the input shaft 4.

The gear mechanism thus has a first gear stage with an input sun gear 14. However, the second gear stage does not have its own driving crown-toothed gear but is driven by the driven planet carrier 12, so that the second planet gear 3 drives the second crown-toothed gear 7, which in relation to its own axis of rotation is mounted radially on the inside and outside via the bearings 6 and 10.

Since the respective bolt 11 receives the first planet gear 2 and the second planet gear 3 and is connected to both planet gears (2, 3) for conjoint rotation, the two planet gears (2, 3) are oriented coaxially to each other.

The number of bolts 11 with such planet gears (2, 3) respectively received thereon is, for example, two, three, or four.

The axes of rotation of the bolts 11 intersect and the common point of intersection of these axes of rotation lies on the axis of rotation of the sun gear 14. With, for example, two bolts 11, the axes of rotation of the two planet gears 2 and 3 are arranged in the same plane as the axis of rotation of the sun gear 14.

The first crown-toothed gear 5 is oriented coaxially to the second crown-toothed gear 7.

The positions of the planet gears (2, 3) can be adjusted using shims.

Figure 2:
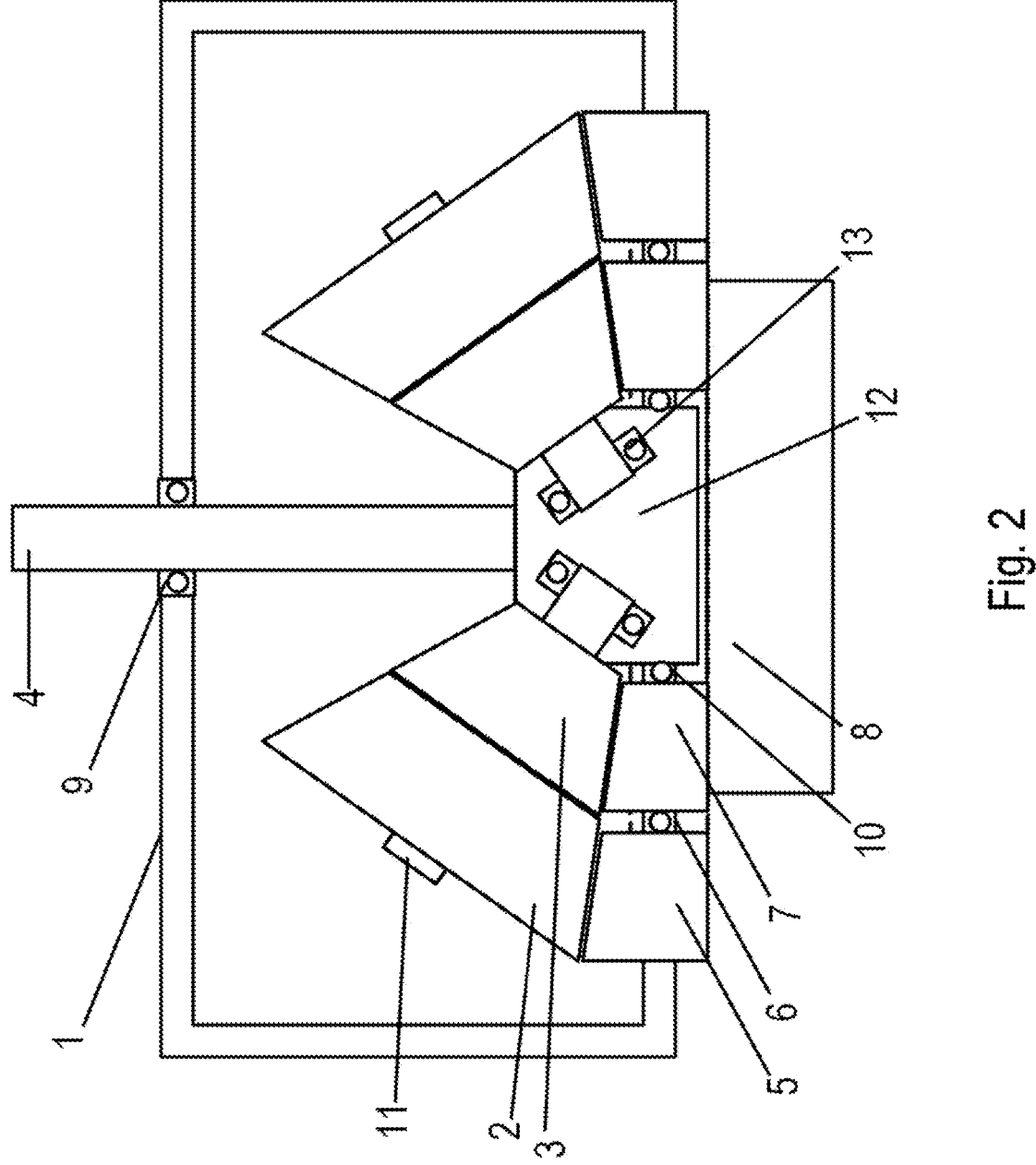
FIG. 2 illustrates a second planetary gear mechanism, in which the planet carrier 14 is driven without the sun gear 14.

As illustrated in FIG. 2, the planet carrier 12 can also be driven directly, so that the sun gear 14 is not required.

The input shaft 4v thus directly drives the planet carrier 12, which thus carries the bolts 11, whereby the respective first planet gear 2 rolls off of the first crown-toothed gear 5 and thereby the second planet gear 3 is synchronously rotated, which second planet gear 3 drives the second crown-toothed gear 7, which is connected to the output shaft 8 for conjoint rotation.

The configuration illustrated in FIG. 2 thus requires fewer components than the configuration illustrated in FIG. 1.

Figure 3:
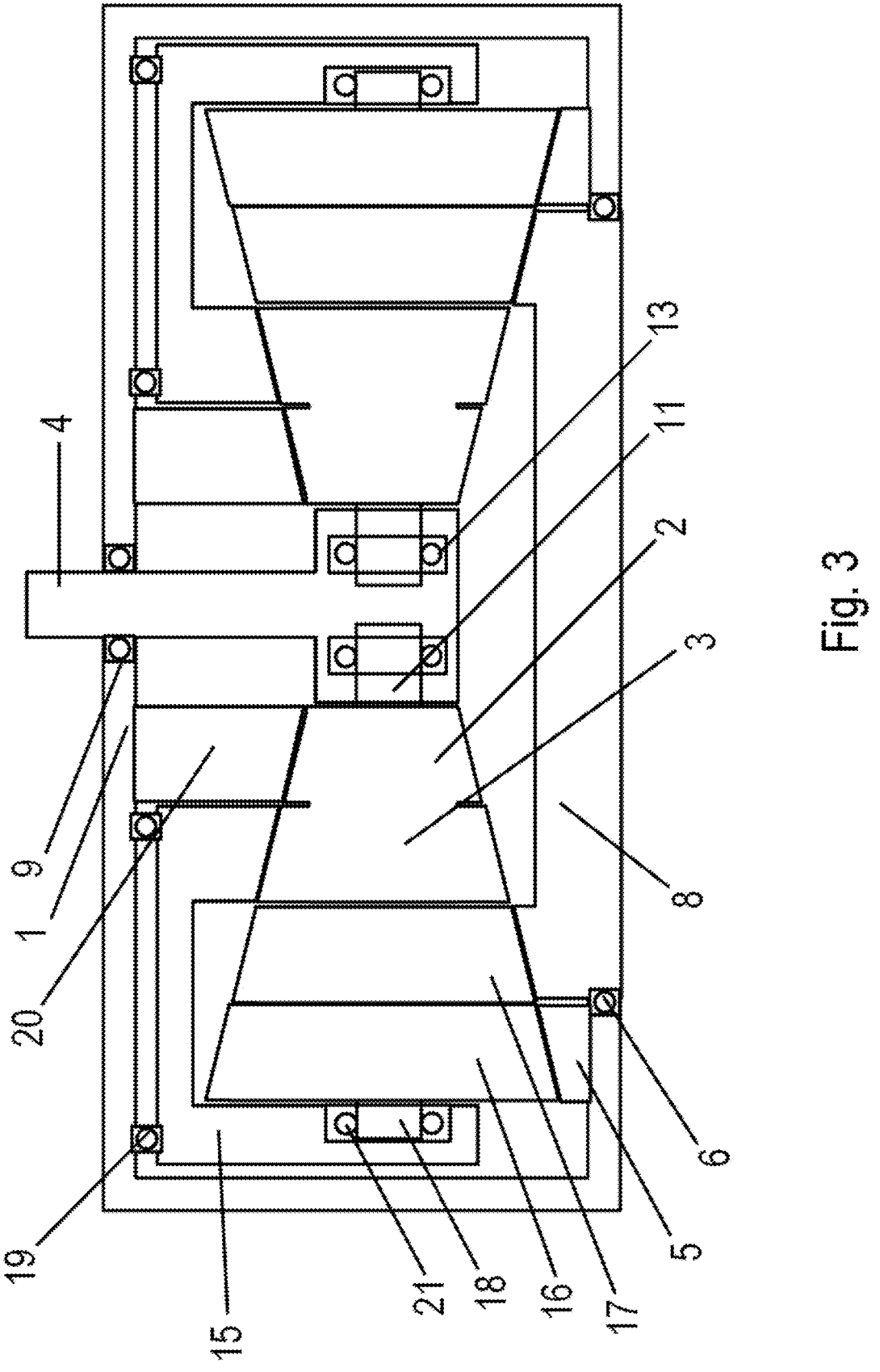
FIG. 3 illustrates a planetary gear mechanism arranged in a planar manner.
Figure 4:
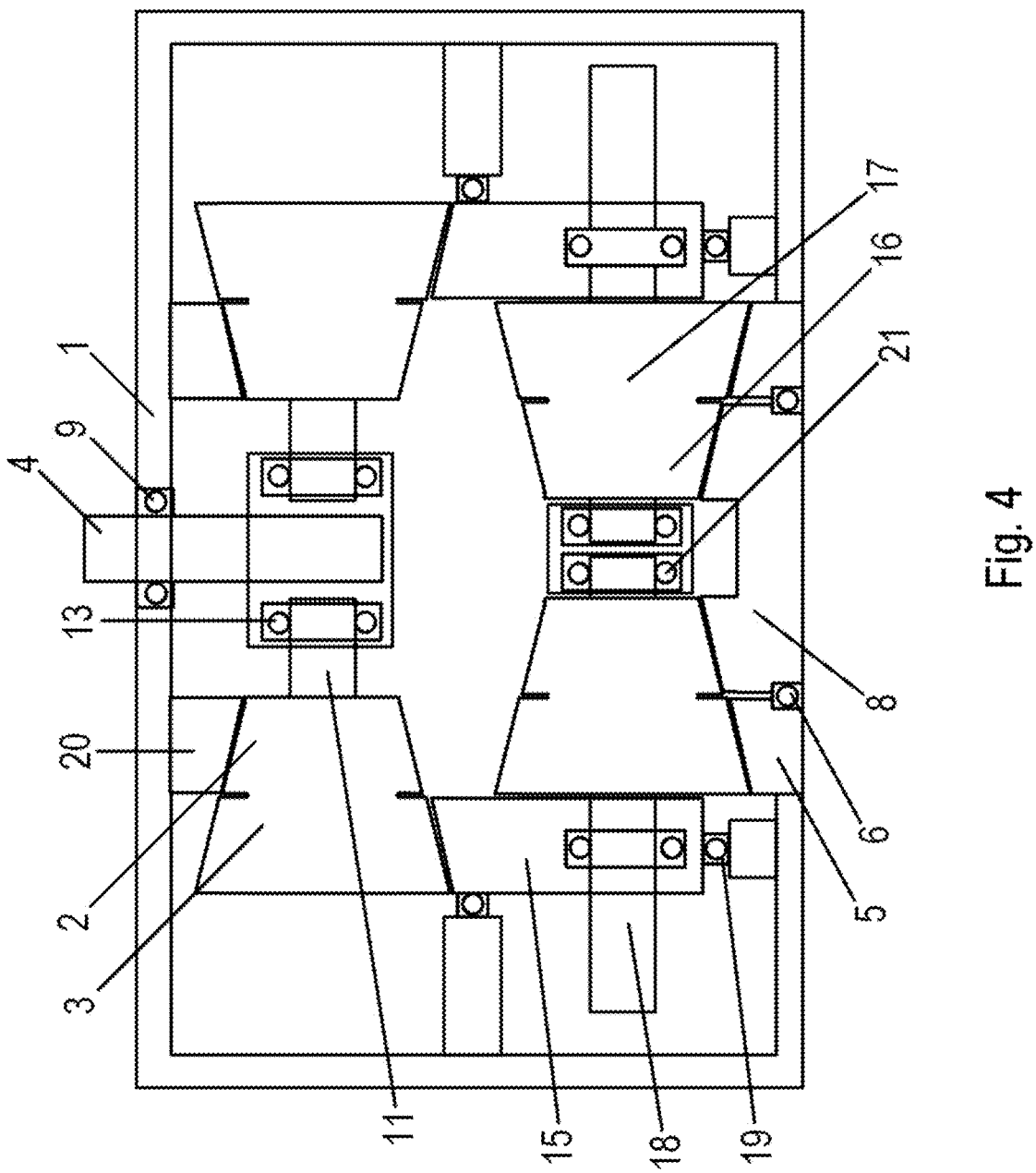
FIG. 4 also illustrates a planetary gear mechanism, which, however, has more stages than the planetary gear mechanism illustrated in FIG. 3.

As illustrated in FIG. 3, the planetary gear mechanism has a planar configuration. Here again, the input shaft 4 and the output shaft 8 are arranged coaxially to each other.

The input shaft 4 directly drives the first planet carrier, in which first bolts 11 are mounted, which are oriented perpendicular to the input shaft 4 and are rotatably mounted via bearings 13, which are received in the first planet carrier.

The first and second planet gears (2, 3) are arranged on the first bolts 11. The first planet gear 2 meshes with a crown-toothed gear 20 which is connected to the housing 1 for conjoint rotation, so that the second planet gear 3, which meshes with a crown toothing of a second planet carrier 15, drives the second planet carrier 15, which is rotatably mounted relative to the housing 1 via bearings 19.

The bearings 21 are received in the second planet carrier 15, with which bearings 21 bolts 18 are rotationally mounted, which bolts 18 are oriented coaxially to the bolts 11, but, for example, are not connected for conjoint rotation.

In each case, two gears (16, 17) are connected to each other for conjoint rotation and arranged on the bolts 18, and a first gear 16 of the two gears (16, 17) meshes with a crown toothing of the second planet carrier 15 and the other gear 17 of the two gears (16, 17) meshes with a crown toothing of the output shaft 8.

The crown toothings of the second planet carrier 15 and also of the output shaft 8 and the crown-toothed gear 20 are all oriented parallel and coaxially to each other.

The axes of rotation of the planet gears 5, 6 and gears (16, 17) are arranged coaxially to each other and perpendicular to the axis of rotation of the input shaft 4 and the output shaft 8.

The axes of rotation of the two planet gears 2 and 3 intersect the axis of rotation of the input shaft 4.

The axes of rotation of the two gears 16 and 17 intersect the axis of rotation of the input shaft 4.

Figure 5:
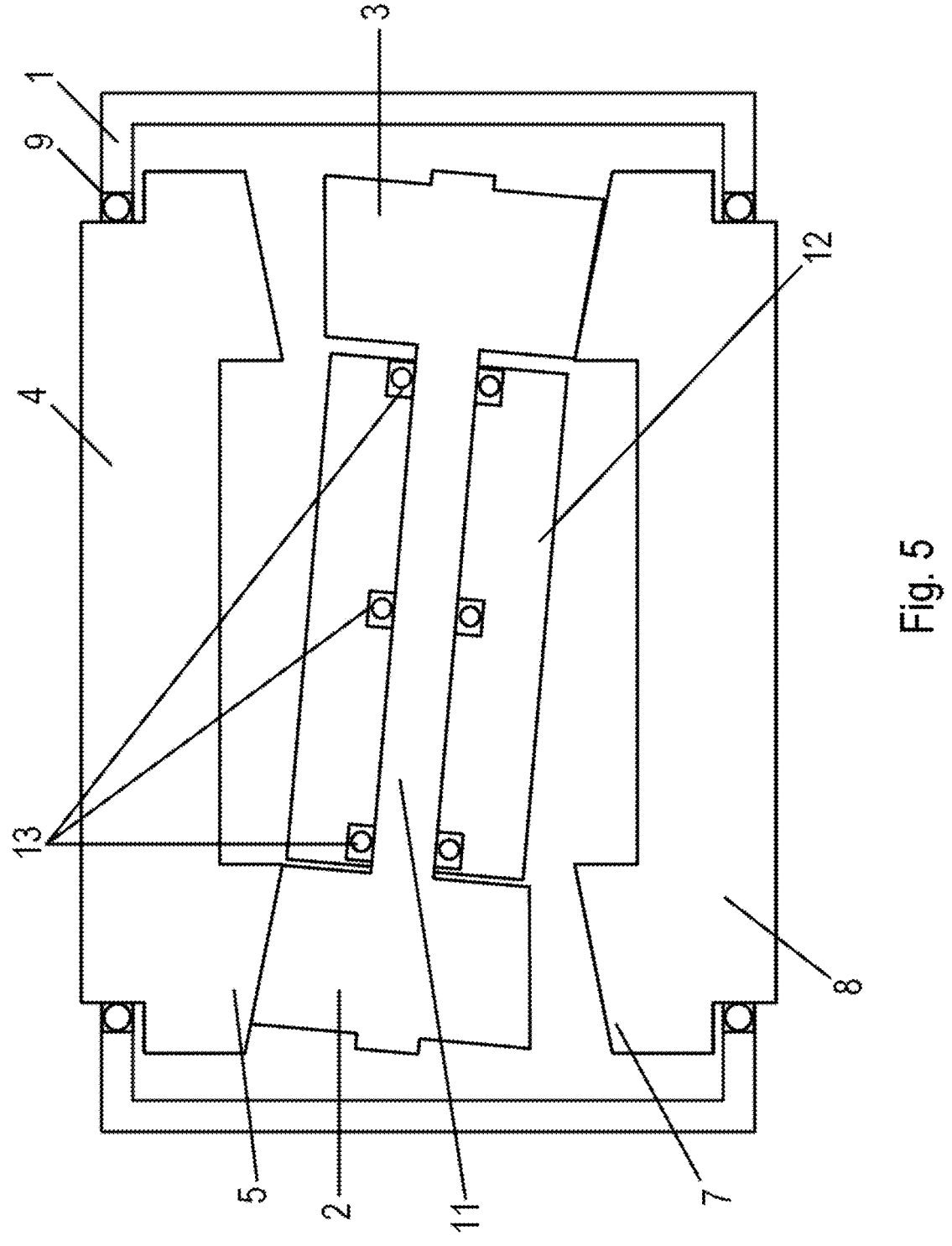
FIG. 5 is a schematic cross-sectional view of a planetary gear mechanism with a fixed planet carrier 11.
Figure 6:
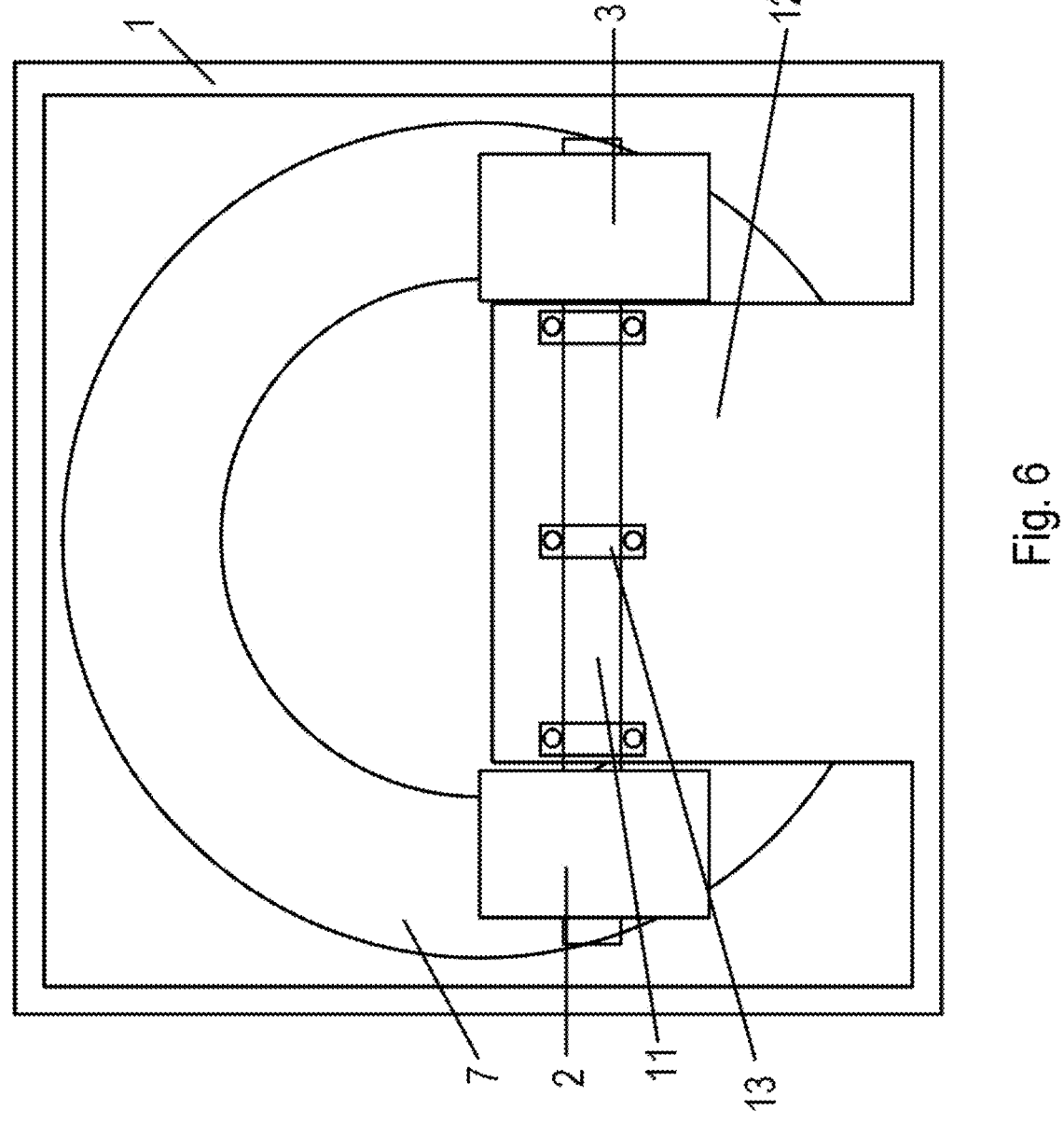
FIG. 6 is a top view corresponding to FIG. 5.

As illustrated in FIG. 5 and FIG. 6, the gear mechanism is provided with an output shaft 8 arranged coaxially to the input shaft 4.

A bolt 11, e.g., arranged as a planet carrier, is arranged between the output shaft 8 and the input shaft 4, and a first gear wheel 2 and a second gear wheel 3 are connected to the bolt 11 for conjoint rotation.

The input shaft 4 has a crown toothing that meshes with the first gear wheel 2.

The axis of rotation of the input shaft 4 is at an angle to the axis of rotation of the first gear wheel 2. For example, the axis of rotation of the input shaft 4 is at a distance from the axis of rotation of the first gear wheel 2 and not perpendicular to it, but is at an angle of between 0° and 90° to the axis of rotation of the first gear wheel 2.

The second gear wheel 3, which is connected to the first gear wheel 2 for conjoint rotation via the bolt 11, meshes with a crown toothing of the output shaft 8. This output shaft 8 is thus driven by the second gear wheel 3.

The crown toothing of the input shaft 4 is coaxial and/or parallel to the crown toothing of the output shaft 8.

The planet carrier 12 is firmly connected to the housing 1.

Figure 7:
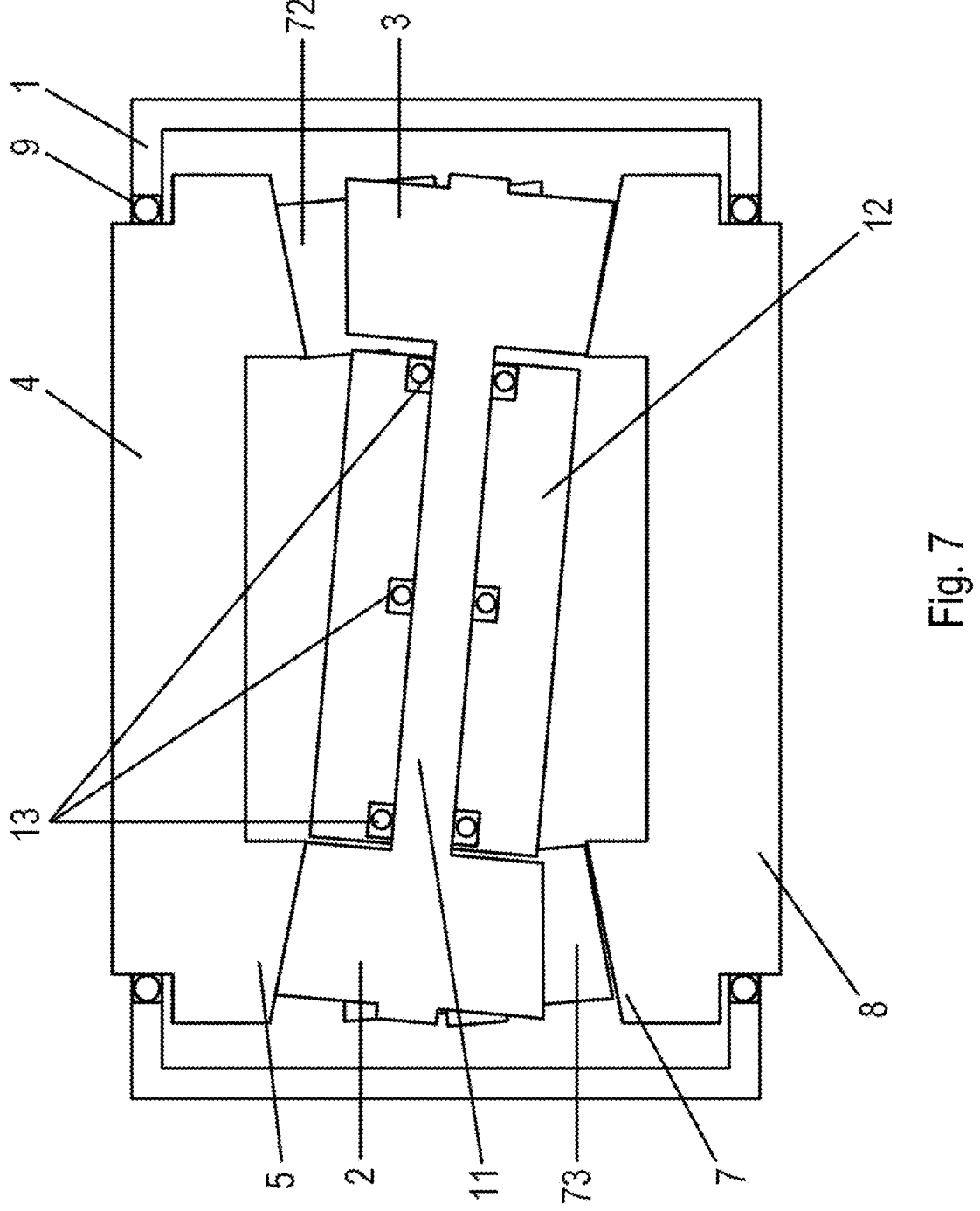
FIG. 7 is a schematic cross-sectional view of a planetary gear mechanism which, in contrast to FIGS. 5 and 6, has a second bolt 11 rotatably mounted relative to the first planet carrier 12.
Figure 8:
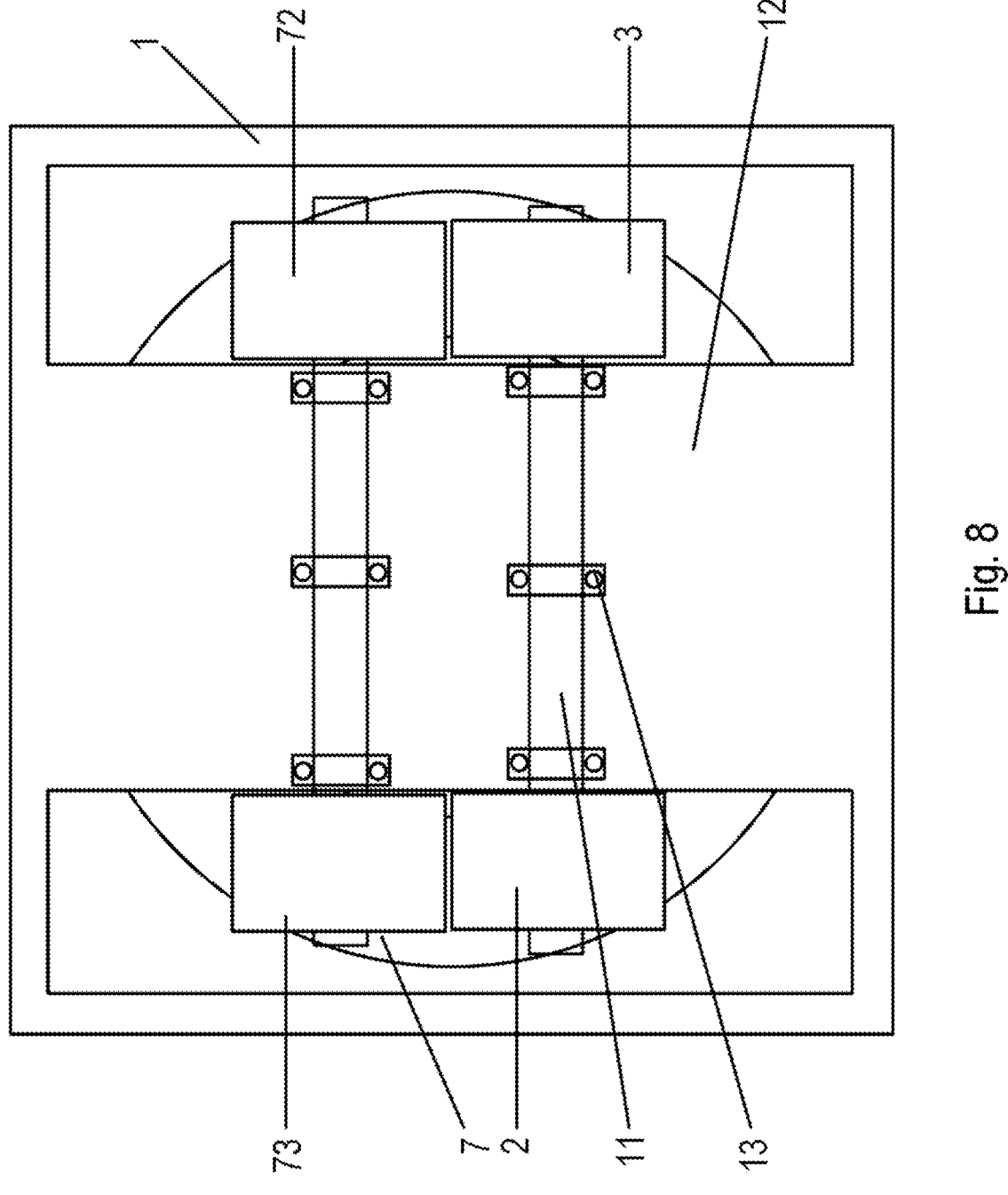
FIG. 8 is a top view corresponding to FIG. 7.
Figure 9:
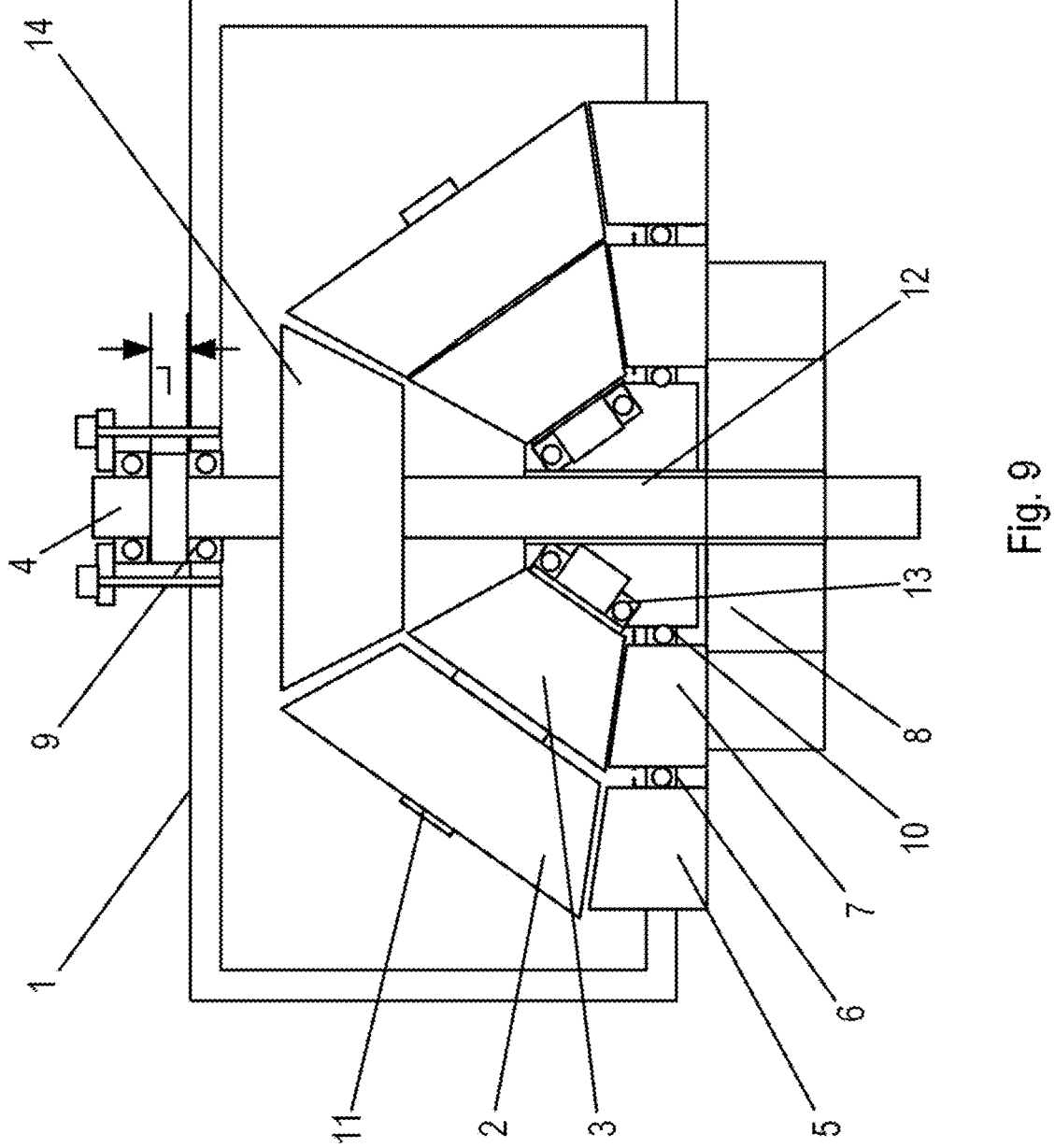
FIG. 9 illustrates a gear mechanism that differs from the gear mechanism illustrated in FIG. 1 in that the output shaft 8 is arranged as a hollow shaft, e.g., so that the input shaft 4 is coaxial with the output shaft and passes through the output shaft.

As illustrated in FIG. 7 and FIG. 8, a second bolt with planet gears 72 and 73 connected for conjoint rotation can be provided, which second bolt is not oriented parallel to the first bolt 11. The two bolts 11 are at a distance from each other, and the first gear wheel 72 is arranged closer to the second gear wheel 3 than to the first gear wheel 2.

The second gear wheel 73 is arranged closer to the first gear wheel 2 than to the second gear wheel 3.

For example, the first gear wheel 2 meshes with the crown toothing of the input shaft 4. The second gear wheel 3 meshes with the crown toothing of the output shaft 8.

The first gear wheel 72 of the other bolt meshes with the crown toothing of the output shaft 8. The second gear wheel 73 meshes with the crown toothing of the input shaft 4.

The two bolts 11 are thus arranged tilted towards each other.

Spiroplan® gear mechanisms are a type of angular gear with offset axles, and the Spiroplan®-toothed gear wheel has teeth arranged in a curve and the associated meshing pinion has worm toothing, e.g., ZA worm toothing, the envelope of which, for example, is a cylinder, i.e., not a cone.

LIST OF REFERENCE NUMERALS

1 Housing
2 First planet gear, e.g., planetary gear
3 First planet gear, e.g., planetary gear
4 Input shaft
5 First crown-toothed gear
6 Bearing
7 Second crown-toothed gear
8 Driven shaft
9 Bearing
10 Bearing
11 Bolt
12 First planet carrier
13 Bearing
14 Central gear, e.g., sun gear
15 Second planet carrier
16 Gear
17 Gear
18 Bolt
19 Bearing
20 Crown-toothed gear
72 First planet gear, e.g., planetary gear
73 First planet gear, e.g., planetary gear

The invention claimed is:

1. A gear mechanism having a gear stage, comprising:
an input shaft;
a first planet carrier;
a first planet gear;
a second planet gear;
a first crown-toothed gear;
a second planet carrier;
a second crown-toothed gear;
a first gear wheel;
a second gear wheel;
an output shaft; and
a housing;
wherein the input shaft is oriented coaxially to the output shaft;
wherein the first planet carrier is connected to the input shaft for conjoint rotation;
wherein axes of rotation of the first gear wheel, the second gear wheel, the first planet gear, and the second planet gear are arranged coaxially to each other and/or oriented perpendicular to an axis of rotation of the input shaft;
wherein the first gear wheel is connected to the second gear wheel for conjoint rotation;
wherein the first planet gear is connected to the second planet gear for conjoint rotation;
wherein the first crown-toothed gear is connected to the housing for conjoint rotation;
wherein a toothing of the first planet gear meshes with a toothing of the first crown-toothed gear;
wherein a toothing of the second planet gear meshes with a crown toothing formed on the second planet carrier;

wherein a bearing rotatably mounting the first gear wheel and the second gear wheel is received in the second planet carrier;
wherein a toothing of the first gear wheel meshes with a toothing of the second crown-toothed gear;
wherein the second crown-toothed gear is connected to the housing for conjoint rotation; and
wherein a toothing of the second gear wheel meshes with a crown toothing of the output shaft.

2. The gear mechanism according to claim 1, wherein the bearing received in the second planet carrier supports a second bolt on which the first gear wheel is rotatably mounted.

3. The gear mechanism according to claim 1, wherein a bearing received in the first planet carrier supports a first bolt on which the first planet gear is rotatably mounted.

4. A gear mechanism having a gear stage, comprising:
an input shaft;
a first planet carrier;
a first gear;
a second gear;
an output shaft; and
a housing;
wherein the input shaft is oriented coaxially to the output shaft;
wherein the input shaft has a first crown toothing on an end face facing the output shaft;
wherein the output shaft has a second crown toothing on an end face facing the input shaft;
wherein the first crown toothing is at a distance from the second crown toothing;
wherein a toothing of the first gear meshes with the first crown toothing;
wherein a toothing of the second gear meshes with the second crown toothing;
wherein the first gear is connected to the second gear for conjoint rotation;
wherein the first gear is arranged at a distance from the second gear;
wherein an axis of rotation of the first gear is arranged at a distance from an axis of rotation of the input shaft in a radial direction relative to the axis of rotation of the input shaft;
wherein a direction of the axis of rotation of the first gear has an angle between 0° and 90° to a direction of the axis of rotation of the input shaft; and
wherein the first gear and the second gear are rotationally mounted by bearings received in the first planet carrier, the first planet carrier being connected to the housing of the gear mechanism in a fixed manner and/or for conjoint rotation.

5. The gear mechanism according to claim 4, wherein the input shaft is rotatably mounted by a bearing received in the housing of the gear mechanism.

6. The gear mechanism according to claim 4, wherein the output shaft is rotatably mounted by a bearing received in the housing of the gear mechanism.

7. The gear mechanism according to claim 4, wherein the axis of rotation of the first gear is oriented coaxially to an axis of rotation of the second gear.

8. The gear mechanism according to claim 4, wherein the direction of the axis of rotation of the first gear has an angle between 5° and 85° to the direction of the axis of rotation of the input shaft.

9. A gear mechanism having a gear stage, comprising:
an input shaft;
a sun gear;

a first planet carrier;

a first and a second planet gear;

a first crown-toothed gear;

an output shaft; and a housing;

wherein the input shaft is oriented coaxially to the output shaft;

wherein the output shaft is arranged as a hollow shaft and the input shaft projects through the output shaft;

wherein axes of rotation of the first planet gear and the second planet gear are arranged coaxially to each other and/or have an angle of between 10° and 80° to an axis of rotation of the input shaft, wherein the first planet gear is connected to the second planet gear for conjoint rotation;

wherein the first crown-toothed gear is connected to the housing for conjoint rotation;

wherein the sun gear is connected to the input shaft for conjoint rotation;

wherein a toothing of the first planet gear meshes with a toothing of the first crown-toothed gear and with a toothing of the sun gear; and wherein a toothing of the second planet gear meshes with a crown toothing formed on the output shaft.

10. The gear mechanism according to claim 9, wherein the first planet gear and the second planet gear are rotatably mounted relative to the first planet carrier via a bearing received in the first planet carrier or which are plugged onto a bolt which is connected to the first planet carrier for conjoint rotation.

11. The gear mechanism according to claim 9, wherein the first planet carrier is rotatably mounted relative to the output shaft by a bearing received by the output shaft.

12. The gear mechanism according to claim 9, wherein a radial distance range covered by the first planet carrier relative to an axis of rotation of the output shaft is included by a radial distance range covered by the output shaft relative to the axis of rotation of the output shaft.

13. The gear mechanism according to claim 12, wherein the radial distance range covered by the first planet carrier relative to the axis of rotation of the output shaft is arranged radially within a radial distance range covered by the crown toothing of the output shaft relative to the axis of rotation of the output shaft.

14. The gear mechanism according to claim 9, wherein the axis of rotation of the first planet gear forms a plane with an axis of rotation of the sun gear, to which an axis of rotation of a further first planet gear is not parallel but intersects the axis of rotation of the sun gear at a same intersection point as the axis of rotation of the first planet gear.

15. The gear mechanism according to claim 9, wherein the gear stage has no further planet gears.

16. The gear mechanism according to claim 9, wherein the gear stage includes two, three, or exactly three first planet gears, axes of rotation of the first planet gears intersecting an axis of rotation of the sun gear at a same intersection point, and/or the axes of rotation of the first planet gears are arranged at regular distances from each other in a circumferential direction relative to the axis of rotation of the sun gear.

17. The gear mechanism according to claim 9, wherein the axes of rotation of the first and second planet gears intersect an axis of rotation of the sun gear at a same intersection point.

18. The gear mechanism according to claim 9, wherein (a) the toothing of the sun gear and/or the first planet gear is arranged in the shape of a spiral and/or (b) an envelope of the toothing of the sun gear and/or the first planet gear is arranged in the shape of a truncated cone.

19. The gear mechanism according to claim 9, wherein a largest diameter of the sun gear is smaller than a largest diameter of a respective one of the first and second planet gears.

20. The gear mechanism according to claim 9, wherein a largest radial extent of the sun gear relative to an axis of rotation of the sun gear is smaller than a largest radial extent of a respective one of the first and second planet gears relative to the axis of rotation of the respective planet gear.

21. The gear mechanism according to claim 9, wherein a largest diameter of the sun gear is larger than a largest diameter of a respective one of the first and second planet gears.

22. The gear mechanism according to claim 9, wherein a largest radial extent of the sun gear relative to an axis of rotation of the sun gear is larger than a largest radial extent of a respective one of the first and second planet gears relative to the axis of rotation of the respective one of the first and second planet gears.

23. The gear mechanism according to claim 9, wherein the teeth of the toothing of the first crown-toothed gear are curved.

24. The gear mechanism according to claim 9, wherein the sun gear, the first planet gear, the second planet gear, and/or the first crown-toothed gear is made of carburized steel.

25. The gear mechanism according to claim 9, wherein a cross-axis angle between the axis of rotation of a respective one of the first and second planet gears and an axis of symmetry and/or axis of rotation of the first crown-toothed gear or sun gear is between 98° and 132°.

26. The gear mechanism according to claim 24, wherein the first planet gear is one of a plurality of first planet gears, the axes of rotation of the first planet gears are arranged at regular distances from each other in a circumferential direction relative to an axis of rotation of the sun gear, the second planet gear is one of a plurality of second planet gears, and the axes of rotation of the second planet gears are arranged at regular distances from each other in the circumferential direction relative to the axis of rotation of the sun gear.

27. The gear mechanism according to claim 9, wherein: (a) the first planet gear is one of a plurality of first planet gears and the axes of rotation of the first planet gears are arranged at regular distances from each other in a circumferential direction relative to an axis of rotation of the sun gear; and/or (b) the second planet gear is one of a plurality of second planet gears and the axes of rotation of the second planet gears are arranged at regular distances from each other in the circumferential direction relative to the axis of rotation of the sun gear.

* * * * *